March 15, 1966     W. N. POUNDSTONE     3,240,320
SUPPORTING MEANS FOR ENDLESS CONVEYORS
Original Filed Oct. 17, 1957     6 Sheets-Sheet 1
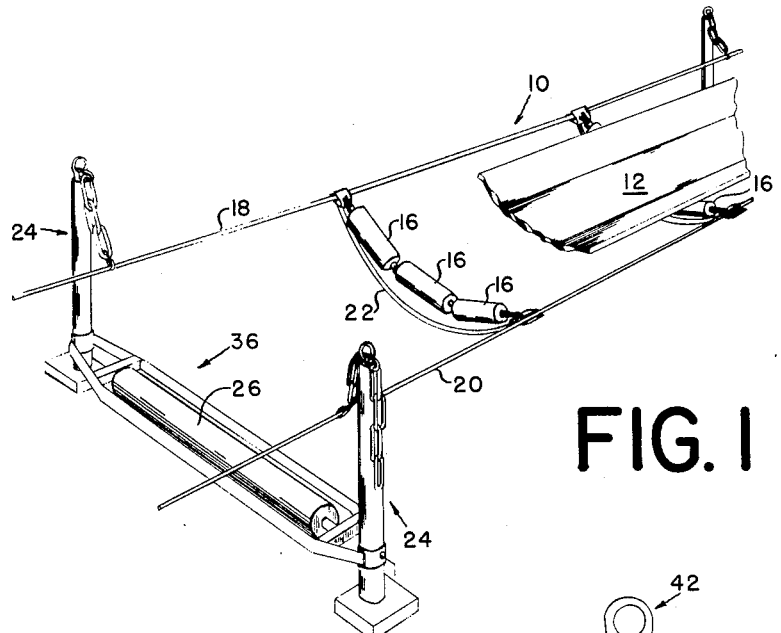
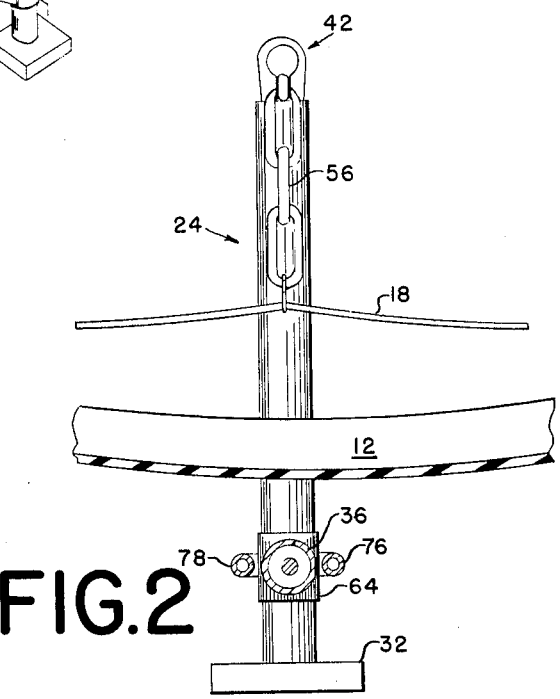
INVENTOR.
WILLIAM N. POUNDSTONE
BY
HIS ATTORNEY March 15, 1966     W. N. POUNDSTONE     3,240,320
SUPPORTING MEANS FOR ENDLESS CONVEYORS
Original Filed Oct. 17, 1957     6 Sheets-Sheet 2
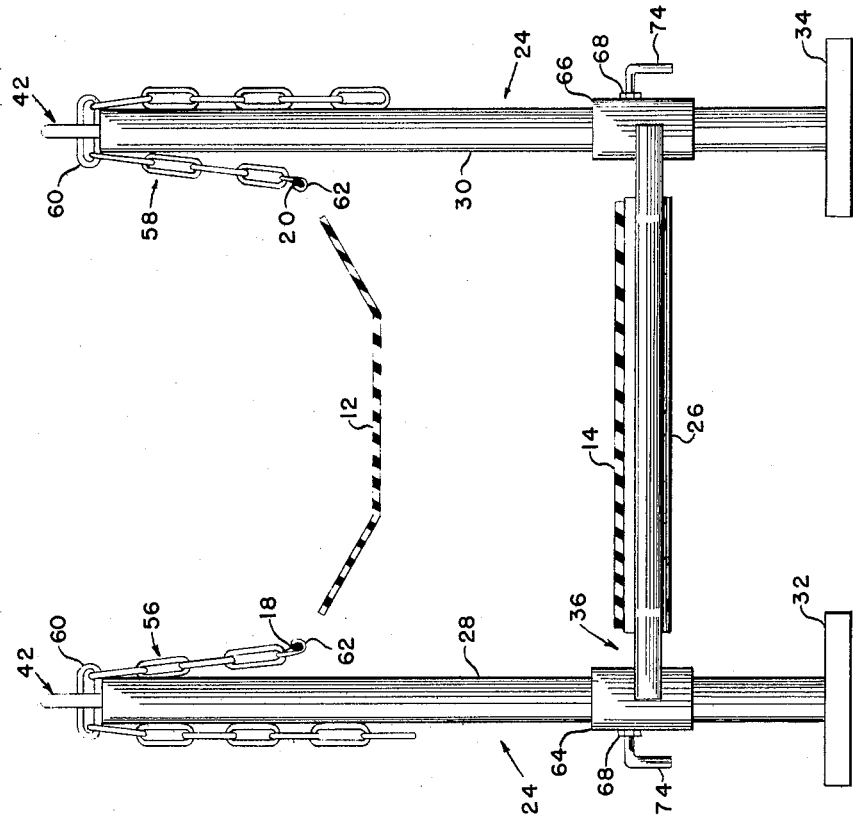
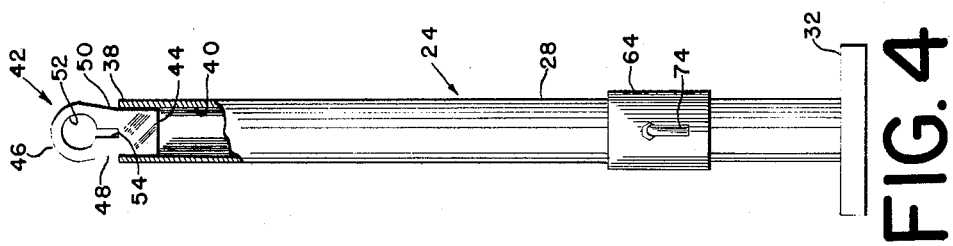
*INVENTOR.*
WILLIAM N. POUNDSTONE
BY
HIS ATTORNEY March 15, 1966 W. N. POUNDSTONE 3,240,320
SUPPORTING MEANS FOR ENDLESS CONVEYORS
Original Filed Oct. 17, 1957 6 Sheets-Sheet 4
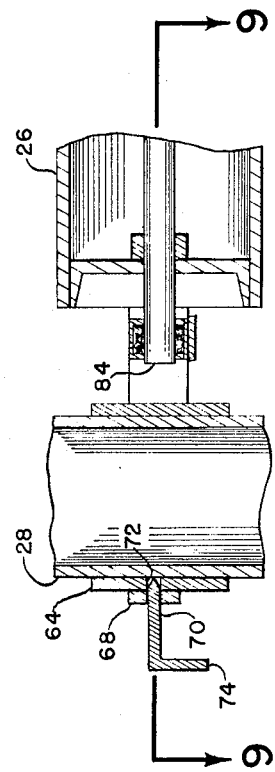
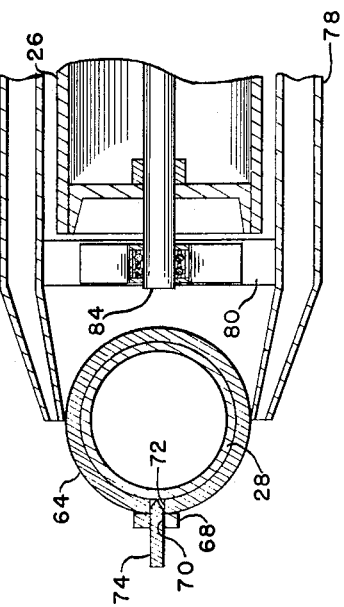
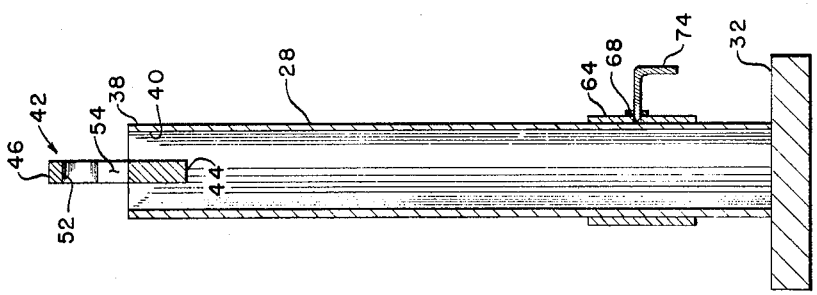
INVENTOR.
WILLIAM N. POUNDSTONE
BY
Stanley J Price
HIS ATTORNEY March 15, 1966 W. N. POUNDSTONE 3,240,320
SUPPORTING MEANS FOR ENDLESS CONVEYORS
Original Filed Oct. 17, 1957 6 Sheets-Sheet 5

*INVENTOR.*
WILLIAM N. POUNDSTONE
BY
*Stanley J Price*
HIS ATTORNEY

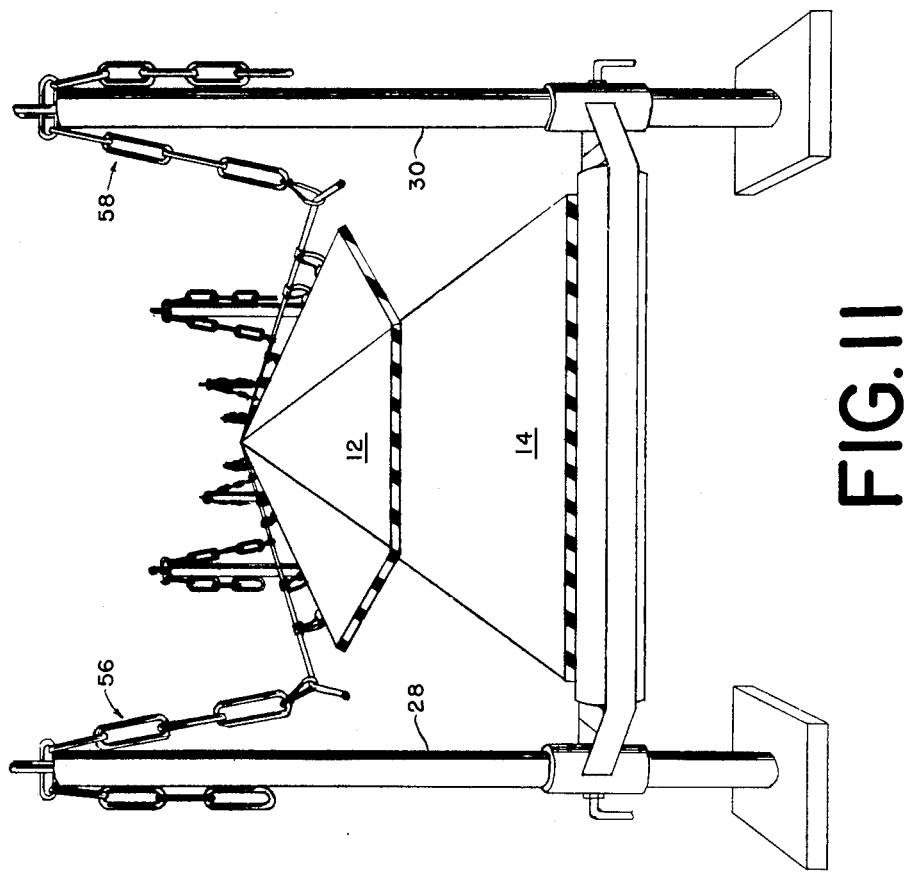

United States Patent Office 3,240,320
Patented Mar. 15, 1966

3,240,320
SUPPORTING MEANS FOR ENDLESS CONVEYORS
William N. Poundstone, Morgantown, W. Va., assignor to Consolidation Coal Company, Pittsburgh, Pa., a corporation of Pennsylvania
Continuation of application Ser. No. 279,679, May 6, 1963, which is a continuation of application Ser. No. 690,684, Oct. 17, 1957. This application Dec. 7, 1964, Ser. No. 418,590
1 Claim. (Cl. 198—192)

This application is a continuation of my copending application Serial No. 279,679, filed, May 6, 1963, entitled "Supporting Means for Endless Conveyors," now abandoned, which in turn is a continuation of application Serial No. 690,684, filed October 17, 1957, entitled "Supporting Means for Endless Conveyors," now abandoned, and is assigned to the present assignee.

This invention relates to a belt type conveyor that is supported along its length by spaced flexible strands and more particularly to the supporting stands for the flexible strands.

Flexible strand conveyor mechanisms include a pair of spaced parallel flexible strands that are maintained in tension between the termini of the conveyor mechanism. At spaced intervals the flexible strands are supported by stands to limit the sagging of the strands and conveyor belt under loaded conditions. The stands are also usually constructed to carry the return idlers for the return reach of the conveyor. Between the spaced stands several idler rollers are secured to the flexible strands and serve as both a supporting and troughing means for the conveying reach of the conveyor belt. As a load on the conveying reach of the belt passes over the flexible idler rollers, the rollers trough and the flexible strands move toward each other and the flexible strands between the spaced stands sag and cushion the load as it passes over the rollers. The cushioning action increases belt life and minimizes spillage of the load.

It has been discovered, however, that the flexible strands have a tendency to move or reciprocate longitudinally when the conveying reach is transporting non-uniform loads. The reciprocal longitudinal movement of the flexible strands is attributed to the increase or decrease in the sag of the flexible strands between the spaced supporting stands. The conventional stands have their vertical supporting members secured to the spaced flexible strands and move reciprocally with the strands. The frequency and intensity of the reciprocal movement results in the stands literally walking and in instances tipping over. It should be pointed out also that the stands must remain aligned to prevent belt edge wear on the return reach of the conveyor. Any appreciable walking of the stands soon results in the loss of alignment between the spaced stands, and the edges of the conveyor belt on the return reach then rub against the vertical support portions of the stand and are soon frayed and worn.

Although the flexible strand type conveying mechanism has many advantages, many of the conventional belt conveyor problems are still present. It is necessary, for example, to prepare an even or level surface for the base of the stands so that the return idler will be in a substantially horizontal plane and the return reach of the conveyor belt will remain centered and not slip from the idler pulley. The spaced stands must also be initially aligned by a transit or other aligning means so that the return reach and conveying reach of the conveyor belt may be properly aligned and the edges remain free from the vertical support members.

Accordingly, the principal object of this invention is to provide an improved support for the flexible strands of a belt conveyor.

A further object of this invention is to provide an improved support for the spaced flexible strands of a belt conveyor that permits the strands to move longitudinally without moving my improved stands.

A further object of this invention is to provide an improved support for the spaced flexible strands of a belt conveyor that may be easily positioned on uneven surfaces while both the conveying reach and the return reach of the belt conveyor remain in substantially horizontal positions.

Another object of this invention is to provide an improved means associated with the supports for the spaced flexible strands of a belt conveyor which indicates whether the spaced supports are in proper alignment.

These and other objects and advantages of this invention will be more completely disclosed and described in the following specification, the accompanying drawings and the appended claims.

In the accompanying drawings, to be taken as part of this specification, I have fully and clearly illustrated my invention, in which drawings:

FIGURE 1 is a perspective view of my improved support stands and the flexible strands supported thereby.

FIGURE 2 is a view in side elevation taken in section through the conveying reach of the conveyor belt and illustrating my improved stand.

FIGURE 3 is a view in front elevation of my improved support stand.

FIGURE 4 is a view in side elevation illustrating the upper portion of the vertical tubular member in section and illustrating the key insert in detail.

FIGURE 7 is a view in vertical section taken along the lines 7—7 in FIGURE 6 with the depending flexible member omitted.

FIGURE 8 is an enlarged fragmentary view in section similar to FIGURE 7 and illustrating the connecting means in detail.

FIGURE 9 is an enlarged plan view in section taken along the line 9—9 in FIGURE 8.

FIGURE 11 is a view similar to FIGURE 10 illustrating the spaced stands in proper alignment.

Figure 5:
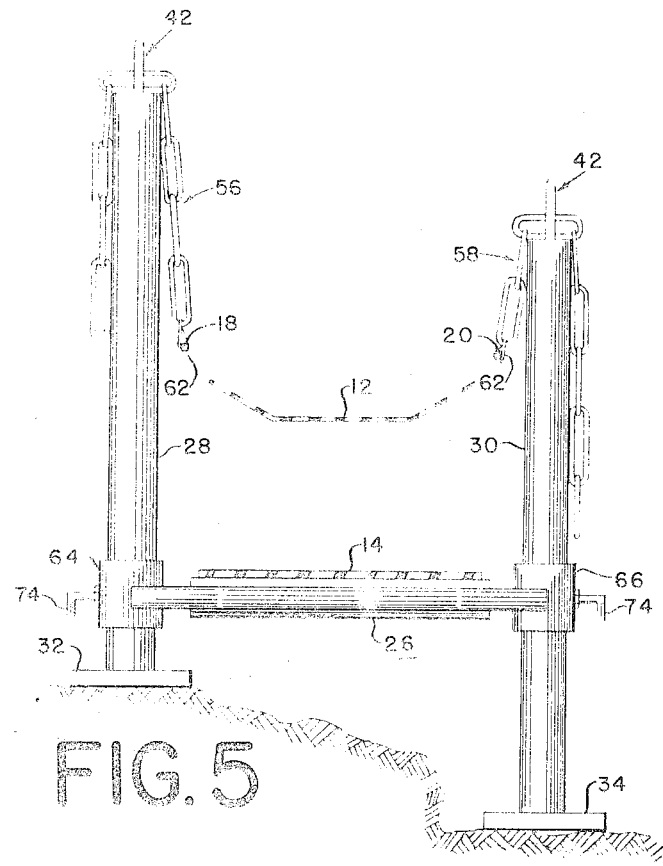
FIGURE 5 is a view similar to FIGURE 3 illustrating my improved stand positioned on an uneven surface.
Figure 6:
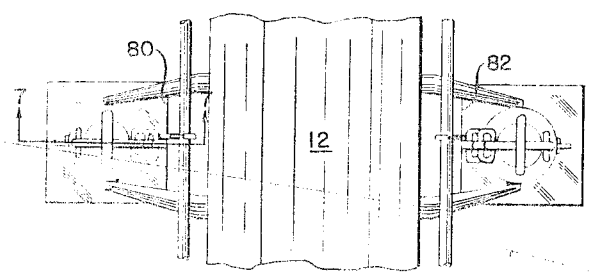
FIGURE 6 is a top plan view in reduced scale of the support stand illustrated in FIGURE 3.

Referring to the drawings there is shown a belt conveyor mechanism generally indicated by the numeral 10 having a conveying reach 12 and a return reach 14 (FIGURE 3). The conveying reach 12 is supported by means of a plurality of troughed idler rollers for idlers 16 secured at their ends to a pair of flexible strands 18 and 20. The flexible strands 18 and 20 are maintained in tension at the termini of the conveyor mechanism and in spaced relation to each other by means of the spreaders 22. The spreaders 22 not only maintain the flexible strands 18 and 20 in spaced relation to each other but also limit the degree of troughing of the conveyor belt conveying reach 12. The idler rollers 16 are arranged to transfer the load on the conveying reach 12 into the flexible strands 18 and 20.

The flexible strands 18 and 20 are supported at predetermined intervals along their length by supporting stands generally indicated by the numeral 24. The supporting stands limit the sagging of both the flexible strands 18 and 20 and the conveying reach 12 as a load is conveyed thereon. The supporting stands 24 include idler rollers 26 which are arranged to support the conveyor belt return reach 14.

Now referring in detail to the supporting stands 24 (FIGURES 3 and 4) there are a pair of spaced vertical tubular members 28 and 30 which have a base or foot portion 32 and 34. A connecting means generally designated by the numeral 36 maintains the vertical support members 28 and 30 in spaced parallel relation to each other. Since the remainder of the vertical support members 28 and 30 is similar in construction, similar numerals will designate similar parts of each. Both the support members 28 and 30 have an open upper end port 38 with a vertical passageway 40 therethrough. Positioned within the vertical passageway 40 is a key like member 42 (FIGURE 4) which has a lower end portion 44 and an upper portion 46. The lower portion 44 has a transverse dimension substantially equal to the diametrical dimension of the vertical support member passageway 40 so that the key like member 42 may be positioned in the passageway 40. The key like member 42 has a pair of diverging side walls 48 and 50 which restricts or limits further passage of the key like member 42 into the vertical support member passageway 40. Adjacent the upper portion 46 the key like member 42 has a circular aperture 52 therethrough and a slotted aperture 54 that intersects the circular aperture 52 at its lower portion. A pair of key like members 42 are positioned in the passageway 40 of both vertical support members 28 and 30. A pair of flexible or universal members, in this instance chains 56 and 58, extend through the respective aperture 52 in the key members 42 and are secured therein by means of link members 60 extending downwardly in the vertical slotted aperture 54. A portion of chains 56 and 58 is in depending relation relative to the vertical support member upper portions 38 and extends inwardly toward the flexible strands 18 and 20. Clip members 62 are secured to the depending end portions of the chains 56 and 58 and are arranged to secure the depending end portions of chains 56 and 58 to the respective flexible strands 18 and 20. In this manner the load that is transferred from the conveying reach 12 to the flexible strands 18 and 20 by means of the conveying idlers 16 is supported by the vertical support members 28 and 30 through the flexible chains 56 and 58. It should be noted at this point that the depending length of chains 56 and 58 may be easily reduced or increased by removing the links 60 from the slotted apertures 54 in the key members 42 and either increasing or decreasing the depending length of respective chains 56 or 58. After the desired depending length of the chain is obtained a link 60 is again inserted in the slotted passageway 54 to fix the depending length of the respective chain.

The connecting means 36 includes a pair of tubular coupling members or sleeves 64 and 66 (FIGURES 3, 8 and 9) which are slidably positioned on the respective vertical tubular support members 28 and 30. Each of the sleeves 64 and 66 has a reinforcing portion 68 secured thereto. Both the reinforcing portions 68 and the sleeves 64 and 66 have aligned apertures 70 and 72 therethrough. The reinforcing member apertures 70 are threaded and threadably carry an L shaped set screw member 74. The set screw 74 is arranged to fixedly position the sleeve members 64 and 66 on the vertical tubular support members 28 and 30. The sleeve members 64 and 66, however, are movable longitudinally on the vertical support members 28 and 30 and with the set screw 74 may be fixedly positioned on the vertical support members 28 and 30 at any desired position.

A pair of spaced tubular stringer members 76 and 78 are secured at their ends to the sleeves 64 and 66 as illustrated in FIGURE 9. The stringers 76 and 78 have transverse spacers 80 and 82 which maintain the stringers 76 and 78 in proper spaced relation to each other and also are arranged to carry the idler roller axle 84.

Thus the connecting means 36 is a unitary structure that is slidable in a vertical plane relative to the vertical support members 28 and 30.

*Operation*

In assembling the conveyor mechanism 10 the flexible strands 18 and 20 are connected to the termini of the conveying mechanism and are drawn into tension. At predetermined intervals supporting stands 24 are positioned with the flexible strands 18 and 20 between the vertical supporting members 28 and 30. Several troughing idlers 16 are secured to the flexible strands 18 and 20 between the spaced supporting stands 24. The flexible strands 18 and 20 are supported by the vertical support members 28 and 30 through the flexible chains 56 and 58 which are secured at their depending ends by means of clips 62 to the flexible strands 18 and 20.

As uneven loads are transported on the conveying reach 12 the sag of the flexible strands 18 and 20 between adjacent supporting stands 24 changes so that the flexible strands 18 and 20 reciprocate or move in a longitudinal direction. As the flexible strands 18 and 20 move longitudinally the depending chains 56 and 58 swing relative to the vertical supporting member top portions 38 and hence the longitudinal movement of the flexible members 18 and 20 is not transmitted to the vertical support members 28 and 30. This results in the vertical support members 28 and 30 remaining in a fixed position and all walking and tipping over of the supporting stands 24 is thereby eliminated.

My improved supporting stands 24 may also, with equal facility, be erected on uneven floors or supporting surfaces as illustrated in FIGURE 5. Irrespective of the type of terrain on which the supporting stands 24 are positioned it is necessary for proper belt operation that both the conveying reach 12 and the return reach 14 be maintained in a substantial horizontal position. This is accomplished with my supporting stands 24 by sliding the sleeves 64 and 66 on the tubular supporting members 28 and 30 until the return idler 26 is in a substantially horizontal plane. The depending length of the chains 56 and 58 is then adjusted so that the flexible strands 18 and 20 are maintained in a substantially horizontal plane and at substantially equal distances above the idler roller 26. The chains 56 and 58 are then secured in this position by means of the key members 42. In this manner both the conveying reach 12 and return reach 14 are maintained in proper operative position without the use of cribbing or block members under the supporting members 28 and 30 as has been the practice. In addition, even on irregular surfaces the longitudinal movement of the flexible strands 18 and 20 is absorbed or taken up by the flexible chains 56 and 58 so that the longitudinal movement of the flexible strands 18 and 20 is not transmitted to the vertical support members 28 and 30.

Figure 10:
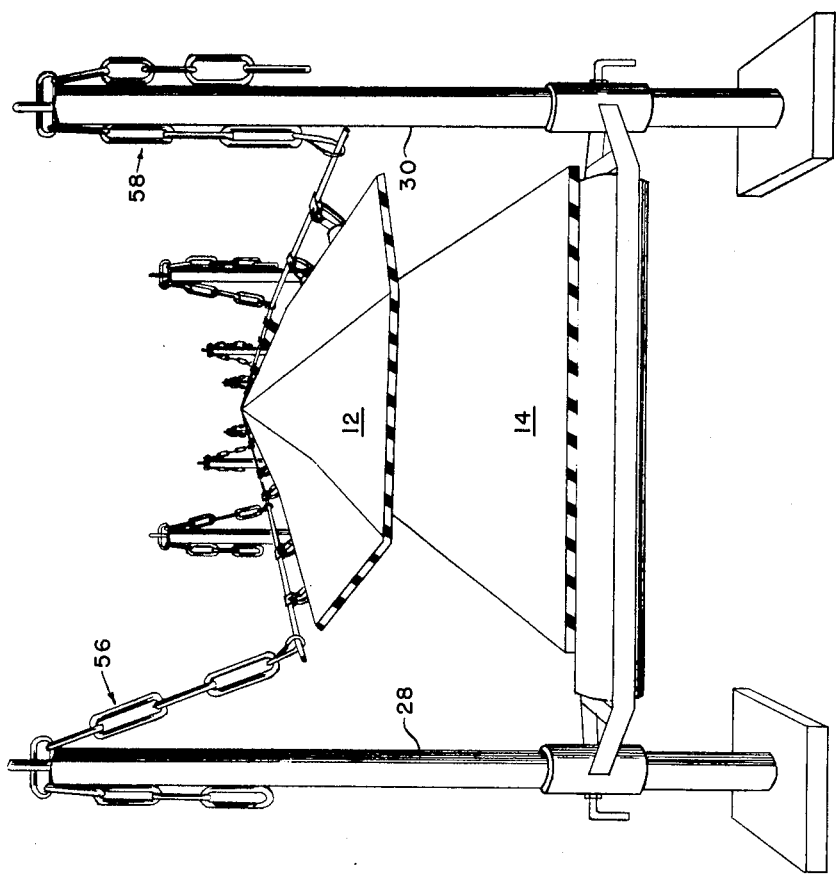
FIGURE 10 is a front perspective of a belt conveyor employing my improved stands and illustrating the spaced stands out of alignment and the flexible members indicating that the stands are not aligned.

With my improved supporting stands it is not possible to determine whether the conveying reach and return reach of the conveyor belt are out of line due to the spaced supporting stands deviating from an aligned position. FIGURE 10 illustrates the front stand as deviating to the left in respect to the remainder of the supporting stands. The nonalignment of the first stand is clearly indicated by means of the angle between the depending chains 56 and 58 relative to the vertical support members 28 and 30. For example, the angle between support 28 and chain 56 is greater than the angle between chain 58 and support 30. This difference in the angles indicates the conveying reach 12 and return reach 14 are not centered intermediately between the vertical support members 28 and 30. A result of this nonalignment is indicated by the position of the return reach 14 relative to the vertical support member 30. This nonalignment would eventually cause fraying of the conveying belt edges.

To remedy this nonalignment all that is required is that an operator check by eye that the angle between the depending portions of chains 56 and 58 relative to the supporting members are in proper alignment. This is clearly illustrated in FIGURE 11 where the spaced supporting members are in proper alignment. This simple indicating means may be employed as a means to properly train the return reach of the conveyor.

According to the provisions of the patent statues, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

In an endless conveyor belt having
a conveying reach and a return reach,
a pair of spaced flexible strands,
flexible troughing idler assembly spanning the distance between said strands for transferring the load on said conveying reach into said strands,
means supporting said strands at intervals throughout their length,
said means including a pair of spaced vertical support members positioned with said flexible strands therebetween,
said support members each having a base portion secured to their lower ends,
connecting means maintaining said vertical supports in spaced parallel relation to each other,
said connecting means including a pair of coupling members movably positioned on said vertical supports and movable longitudinally thereon,
a pair of spaced connecting members secured at their ends to said coupling members,
an idler roller positioned between and operatively connected to said connecting members,
said idler roller arranged to support said conveyor belt return reach,
means to fixedly secure said vertical support members to said coupling members so that said vertical member base portions may be positioned on uneven surfaces and said idler roller maintained in a substantially horizontal plane,
flexible members connected to each of said support member upper end portions,
said flexible members each having portions depending downwardly from said support member upper end portion and inwardly toward said flexible strands,
means connecting each of said flexible member depending end portions to said adjacent flexible strand whereby said depending flexible members support said flexible strands and swing relative to said vertical support member as said flexible strands move longitudinally under conditions of changing loads on said conveying reach while said vertical support members remain stationary,
and means to vary the depending length of said flexible members.

No references cited.

SAMUEL F. COLEMAN, *Primary Examiner.*

RICHARD E. AEGERTER, *Examiner.*